May 11, 1965

R. W. BRONSON ETAL 3,183,361

METHOD OF MAKING GLASS SEALED ELECTRIC CIRCUIT DEVICES AND ARTICLE RESULTING THEREFROM

Filed Aug. 7, 1959

*INVENTORS*
Robert W. Bronson
Norman D. Korbitz
BY
Stevens, Davis, Miller & Mosher
*ATTORNEYS*

United States Patent Office 3,183,361
Patented May 11, 1965

3,183,361

METHOD OF MAKING GLASS SEALED ELECTRIC CIRCUIT DEVICES AND ARTICLE RESULTING THEREFROM

Robert W. Bronson, Dallas, and Norman D. Korbitz, Richardson, Tex., assignors to Texas Instruments Incorporated, Dallas, Tex., a corporation of Delaware Filed Aug. 7, 1959, Ser. No. 832,386
3 Claims. (Cl. 250—239)

This invention relates generally to electric circuit devices and more particularly to that recent class of such devices known as semiconductor components.

An important object of this invention is to provide a method of hermetically sealing a heat sensitive semiconductor element in a protective housing by a heat fusion process without damaging the element itself.

Another object is to provide a method of hermetically sealing a heat sensitive element which is mounted on a glass support in a metal housing which comprises the step of applying heat to the housing but not the support.

A further object is to provide a method of hermetically sealing two opposite ends of a protective housing containing a heat sensitive and light sensitive element with a fusible, transparent glass.

And yet another object is to provide a method of hermetically sealing a photodiode device in a metallic housing having a glass window fused to each end of the housing to permit alternative mounting of the device in circuit installations.

And a further object is to provide a photodiode made by the process of this invention.

And still another object is to provide a method of hermetically sealing an electrical device which includes sliding the hot sharp open edge of a cylindrical housing over an unheated tapered glass support until the housing heats and fuses with the circumferential edge of the support.

An additional object is to provide a method of making an hermetically sealed electrical device having a glass window which includes the process of fusing a flat glass window to the internal surface of the device housing adjacent an opening in the housing by inducing localized heat to the housing adjacent the opening.

And a further object is to provide a rapid method of making a sealed electrical device having at least one fused glass end which is readily adaptable to high speed production line operations.

These and other objects and advantages will be apparent from an examination of the following specification and drawing, in which.

Figures 1, 2, 3, 4, 5, 6, 7, 8, 9:
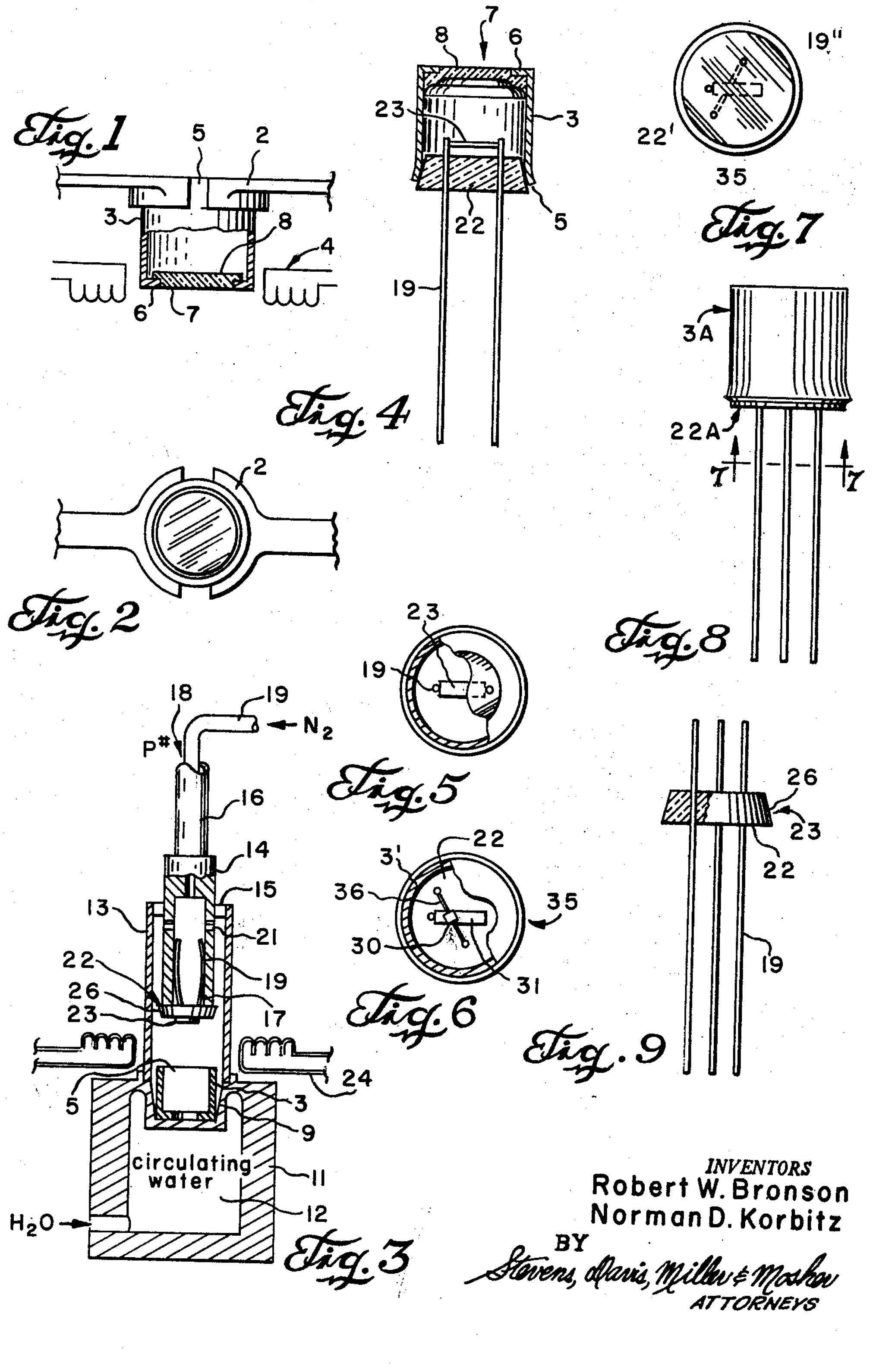
FIG. 1 represents an elevational view in fragmentary section showing the fixture used in supporting the device in one step in the method of this invention.
FIG. 2 is a top plan view of the structure of the fixture and the device shown in FIG. 1.
FIG. 3 is a sectional elevational view showing an example of another structure suitable for use in another step in the method of this invention.
FIG. 4 is a cross sectional elevational view of one device made by the method of this invention.
FIG. 5 is a top plan view partly in section of the device of FIG. 4.
FIG. 6 is a top plan view partly in section of another device made in accordance with this invention.
FIG. 7 is a bottom view of the device of FIG. 6.
FIG. 8 is a side elevational view of the device of FIGS. 6 and 7.
FIG. 9 is a detail elevational view of the glass support employed in the devices shown in FIGS. 4–8.

Referring now more particularly to the drawing, it will be observed that the structure in FIG. 1 represents, in part, an assembly fixture 2 which supports a cylindrical Kovar metal cover or housing 3 in the vicinity of an induction heating coil 4. "Kovar" is the trade name for an iron, cobalt and nickel alloy which has a silver appearance. It will be observed that the cover or housing 3 includes an open end 5 and a partially closed end 6 having a centrally located window 7 therein. The first step in the process of this invention is to de-gas and oxidize the Kovar cover 3; this changes its appearance from silver to black and leaves an oxide film over the entire surface. When the housing 3 is placed in and held by the fixture 2 of FIG. 1, the next process step of this invention is ready to be carried out. This step consists of placing a flat cylindrical glass plug 8 into the open end 5 of the housing 3 until the lower edge of the glass plug 8 rests in the bottom of the housing 3 in covering relation to the open window 7. When induction heating is applied by means of coils 4, the end 6 becomes red hot, and the glass plug softens adjacent the edges of the window and fuses to the inside perimeter of both the housing 3 and the edges of the open window 7. However, it has been noted in carrying out this process step that the glass will adhere to the wall of the housing but will not drop below the horizontal edge of the lower end 6 even when in the inverted position shown, so that a smooth flat contour is formed when the glass is completely and fusibly sealed within the housing as shown in FIG. 4. This phenomenon results, in part, from the fact that the walls of housing 3 contain a thin film of oxide, and glass includes silicon oxide and other oxides which combine with the oxide film on the housing to permit the glass to fuse and hermetically seal to the housing wall. It will be noted in FIG. 2 that the assembly fixture 2 is made up in two parts so that the cylindrical housing 3 may be supported near its top open end 5, the lower end 6 of the housing 3 being unsupported during this process step. When the housing 3 is thus formed with the hermetically sealing glass plug 8 closing the open window 7, the housing 3 is ready for the next process step of this invention. This process is shown in FIG. 3, wherein the housing 3 is inserted into a well 9 in a heat sink 11 containing a supply of circulating water indicated at 12. Above the housing receiving well 9 this assembly fixture includes a shield 13 and a downwardly extending plunger 14 which projects through the shield 13 and is guided in relation to the well 9 by some means such as indicated by the bearings 15. The plunger 14 is adapted to move up and down by virtue of conventional equipment not shown herein, but operating in conjunction with the plunger rod indicated at 16. It will be noted that the plunger 14 is hollow and includes an enlarged cavity 17 near its lower end and a tubular connection indicated at 18 at its upper end to accommodate a tube 19 by which an inert medium such as nitrogen may be circulated through the cavity 17 and through the interior of the shield 13 during the succeeding process steps. The plunger 14 includes small radial openings 21 to permit this nitrogen to have entrance into the interior of the shield 13. The open end of the cavity 17 is adapted to receive the leads 19 of a glass support 22 which contains the electrical circuit element indicated at 23. When the glass support and leads are thus supported in the plunger 14 above and in alignment with the open end 5 of the cover 3, the next process step may now be carried out. This occurs when a radio frequency current is used to energize the induction heating coils 24 which are adjacent the open edge indicated at 5 of the housing 3. Once the RF current is applied, the open end 5 will immediately heat up to a red glowing temperature and at that point the plunger 14 is moved downward so that the tapered circumference 26 of the glass support 22 will engage the open end 5 of the housing 3, and the plunger 14 will continue to move downward until the open end 5 has expanded slightly and simultaneously fused into the peripheral edge 26 of the glass support 22. This entire operation takes place in less than one second due to the fast heating action of the RF coils 24 and due to the tapered engagement and therefore tapered application of the heat from the housing 3 to the periphery 26 of the support 22. During this operation, a supply of water indicated at 12 has been circulating around the lower side of the housing 3 so that it remains relatively cool. This prevents the interior of the housing 3 from becoming heated during this operation and therefore prevents this internal heat from producing any damage to the heat-sensitive electrical element indicated at 23. Since the entire heat application takes place between the inner periphery of the open edge 5 of the housing 3 and the outer periphery 26 of the glass support 22, the heat sensitive element 23 is isolated and protected during this hermetically sealing operation.

FIG. 4 shows the completed device in cross section which was made by the process steps shown in FIGS. 1 and 3. In this device, it will be noted that the cylindrical metal housing 3 having a lower open end 5 and an upper partially closed end 6 includes, respectively, a lower sealing glass plug (support 22) and an upper sealing glass plug 8, both of which are made from transparent glass so that the enclosed electrical device 23 may be a light-sensitive photodiode or solar cell or other similar electrical element, and the completed assembly indicated now at 7 may be mounted in a circuit installation in several structural positions since it will be operative by light entering from either end of the assembly. Both of the glass plugs 22 and 8 are made from a fusible glass known in the trade as Corning Glass Company No. 7052.

In FIG. 5, a top view of the device of FIG. 4 is partly cut away to show the element 23 and one of the lead wires 19 to which it is attached. The other lead wire 19 may be attached directly to the other end of the element 23 or it may be attached separately by means of a lead or jumper wire, not shown.

In FIG. 9, a detail of the glass support 22 may be observed. The glass header 22 is formed about the lead wires 19 in a glass forming operation involving a mold (not shown) in which the three lead wires 19 are inserted through the cavity of the mold prior to the placement of the molten glass therein. Since the wires 19 are made of Kovar, and are oxidized prior to their placement in the mold, the molten glass will readily adhere to the circumference of the wires 19 to form a hermetically bonded connection and produce the device shown in FIG. 9. Since the mold has a tapered internal periphery, the tapered circumference 26 will result on the final formed support piece 22.

The device shown in FIGS. 6–8 is a similarly sealed transistor assembly identified generally at 35 which comprises the glass support assembly 22A which is hermetically sealed in a Kovar housing 3A by a process identical to that described for the embodiment 7 shown in FIG. 4. In this device a tab 31 is imbedded in the class support 22, and this tab is adapted to receive a transistor element 30 which is connected by means of jumper wires 36 to specific leads 19 to form the electrically conductive circuit element as shown.

It should be understood, of course, that the foregoing description relates to the preferred embodiment of the invention, and it is intended to cover all changes and modifications of the example of the invention herein described for the purposes of the disclosure, which do not constitute departures from the spirit and scope of the invention as set forth in the appended claims.

What is claimed is:

1. A method of hermetically enclosing an electric element in a metal housing having a window comprising the steps of inserting transparent glass plug having a perimeter slightly less than the inside perimeter of said housing into said housing and into engagement with the housing in the vicinity of said window and inductively heating above the fusion temperature of the glass plug only that area of the housing around the periphery of said window until the glass plug fuses into hermetic engagement with said housing adjacent said window.

2. A method of hermetically sealing an open-ended housing to a tapered glass support having a heat sensitive element mounted thereon, comprising the steps of placing said housing in a heat sink in an inert atmosphere with the open end of said housing facing away from said heat sink and the end of said housing opposite said open end in contact with said heat sink permitting heat to be conducted therefrom, inductively heating only the rim portion of the open end to a temperature above the fusion point of said glass support, engaging said support into hermetically sealing relationship with said heated rim, and applying pressure to said glass support, thereby to cause said glass support to expand the heated rim of said housing and fuse thereto.

3. A hermetically sealed photodiode comprising a fusable glass support having a circular tapered periphery, wire leads projecting through said support, a semiconductor element on one surface of said support and electrically connected to at least one of said leads, a circular metallic housing enclosing said photodiode and having a glass window in one end thereof and being fusibly sealed to the periphery of said support at its other end and forming a hermetically sealed enclosure about said semiconductor element with a light admitting surface on opposite sides of said element.

References Cited by the Examiner

UNITED STATES PATENTS

| | | | |
|---|---|---|---|
| 2,140,725 | 12/38 | Treacy | 338—19 |
| 2,144,519 | 1/39 | Wilson | 313—101 |
| 2,205,582 | 6/40 | Steimel | 65—40 |
| 2,386,820 | 10/45 | Spencer | 65—32 |
| 2,426,053 | 8/47 | Roberds | 219—10.43 |
| 2,433,627 | 12/47 | Roberds | 219—10.43 |
| 2,446,277 | 8/48 | Gordon | 65—59 |
| 2,480,903 | 9/49 | Charbonneau | 65—59 |
| 2,508,233 | 5/50 | Dorgelo et al. | 65—24 |
| 2,598,286 | 5/52 | Mulder et al. | 65—40 |
| 2,697,309 | 12/54 | Gates | 65—59 |
| 2,788,381 | 4/57 | Baldwin | 136—4 |
| 2,813,957 | 11/57 | Gasling | 338—19 |
| 2,817,046 | 12/57 | Weiss | 65—40 |
| 2,836,702 | 5/58 | Stelmak et al. | 29—502 X |
| 2,920,785 | 1/60 | Veres | 65—40 |
| 2,998,554 | 8/61 | Koets et al. | 317—234 |
| 3,080,738 | 3/63 | Frazier et al. | 65—40 |

DONALL H. SYLVESTER, *Primary Examiner.*

CHARLES R. HODGES, ARTHUR P. KENT, WILLIAM B. KNIGHT, *Examiners.*